US012170161B2

(12) United States Patent
Glazer et al.

(10) Patent No.: US 12,170,161 B2
(45) Date of Patent: Dec. 17, 2024

(54) STOCK SOLUTION

(71) Applicants: URBAN MINING CORP B.V., Rotterdam (NL); DELFT UNIVERSITY OF TECHNOLOGY, Delft (NL)

(72) Inventors: Piotr Jakub Glazer, Delft (NL); Ronald Alphons Penners, Delft (NL); Simon Petrus Maria Berkhout, Delft (NL); Peter Carlo Rem, Rijswijk (NL)

(73) Assignees: URBAN MINING CORP B.V., Rotterdam (NL); TECHNISCHE UNIVERSITEIT DELFT, Delft (NL)

( * ) Notice: Subject to any disclaimer, the term of this patent is extended or adjusted under 35 U.S.C. 154(b) by 133 days.

(21) Appl. No.: 17/442,395

(22) PCT Filed: Mar. 27, 2020

(86) PCT No.: PCT/NL2020/050215
§ 371 (c)(1),
(2) Date: Sep. 23, 2021

(87) PCT Pub. No.: WO2020/197398
PCT Pub. Date: Oct. 1, 2020

(65) Prior Publication Data

US 2022/0351886 A1 Nov. 3, 2022

(30) Foreign Application Priority Data

Mar. 27, 2019 (NL) ...................................... 2022821

(51) Int. Cl.
*H01F 1/44* (2006.01)
*B22F 1/145* (2022.01)

(52) U.S. Cl.
CPC .............. *H01F 1/445* (2013.01); *B22F 1/145* (2022.01); *B22F 2301/35* (2013.01); *B22F 2304/10* (2013.01); *B22F 2304/15* (2013.01)

(58) Field of Classification Search
CPC ....... H01F 1/445; B22F 1/145; B22F 2301/35
See application file for complete search history.

(56) References Cited

U.S. PATENT DOCUMENTS

| | | | | |
|---|---|---|---|---|
| 4,280,918 | A | 7/1981 | Homola et al. | |
| 4,997,533 | A | 3/1991 | Kawatra et al. | |
| 5,300,268 | A * | 4/1994 | Van Diest .............. | C01G 49/10 423/493 |

FOREIGN PATENT DOCUMENTS

| | | | |
|---|---|---|---|
| DE | 99972 | A1 | 9/1973 |
| EP | 0968961 | A2 | 1/2000 |

(Continued)

OTHER PUBLICATIONS

Francisco J. Navarro-Brull, "Reduction of Dispersion in Ultrasonically-Enhanced Micropacked Beds", Ind. Eng. Chem. Res. 2018, 57, 122-128. (Year: 2018).*

(Continued)

*Primary Examiner* — Brian D Walck
*Assistant Examiner* — Nazmun Nahar Shams
(74) *Attorney, Agent, or Firm* — LUCAS & MERCANTI, LLP

(57) ABSTRACT

A process and a system for producing a stock solution for production of a ferrofluid is provided. The process includes contacting an acidic solution in a reaction container filled with an excess of a bulk material containing Fe(III) and optionally Fe(II). The acid reacts with the bulk material to form the stock solution (Ls) having dissolved ferric (Fe(III)) and optionally ferrous (Fe(II)) ions which is then separated from the bulk material.

17 Claims, 1 Drawing Sheet

(56) References Cited

FOREIGN PATENT DOCUMENTS

| | | | |
|---|---|---|---|
| EP | 1800753 | A1 | 6/2007 |
| EP | 2805920 | A2 | 11/2014 |
| EP | 2829620 | A1 | 1/2015 |
| GB | 1495035 | A | 12/1977 |
| JP | H02206691 | A | 8/1990 |
| WO | 0123627 | A1 | 4/2001 |
| WO | 2013086555 | A1 | 6/2013 |
| WO | 2014158016 | A1 | 10/2014 |
| WO | 2015050451 | A1 | 4/2015 |

OTHER PUBLICATIONS

M. Usman et.al. “Magnetite and Green Rust: Synthesis, Properties, and Environmental Applications of Mixed-Valent Iron Minerals”, Chem. Rev. 2018, 118, 3251-3304. (Year: 2018).*

International Search Report and Written Opinion for Corresponding International Application No. PCT/NL2020/050215 (10 Pages) (Jun. 3, 2020).

International Preliminary Report on Patentability for Corresponding International Application No. PCT/NL2020/050215 (15 Pages) (May 14, 2021).

Lu et al., “Dissolution of Metal Ferrites and Iron Oxides by HCl under Oxidising and Reducing Conditions”, Hydrometallurgy, 1988, vol. 21, pp. 9-21.

Schilling et al., “Attritors and Ball Mills How They Work”, Presented at the Philadelphia Society For Coatings Technology Inc. Eastern Training Conference and Show, 2000, pp. 1-10.

Office Action for corresponding Japanese Patent Application No. 2021-560161, dated Mar. 4, 2024 and English Translation (23 pages).

* cited by examiner

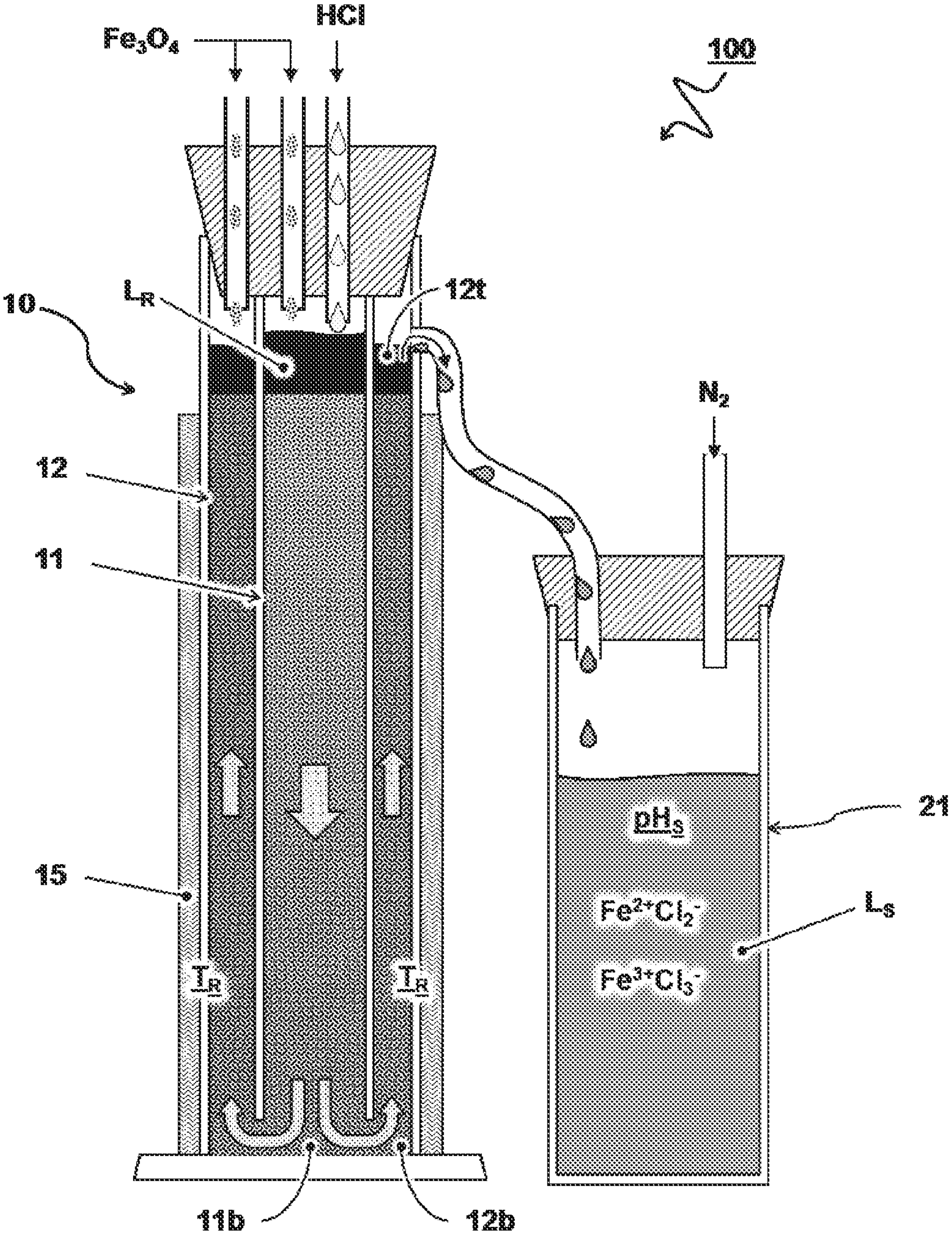
Fe3O4
HCl
100
10
LR
12t
N2
12
11
21
pHS
15
Fe2+Cl2-
LS
Fe3+Cl3-
TR
TR
11b
12b

STOCK SOLUTION

CROSS-REFERENCE TO RELATED APPLICATIONS

This application is a 371 of PCT/NL2020/050215, filed Mar. 27, 2020, which claims the benefit of Netherlands Patent Application No. 2022821, filed Mar. 27, 2019.

FIELD OF THE INVENTION

The present disclosure relates to the preparation of iron-containing stock solutions. The invention is particularly directed to the preparation of a stock solution (Ls) for production of a ferrofluid (Lf).

BACKGROUND OF THE INVENTION

Ferrofluids are liquids that become strongly magnetized in the presence of a magnetic field and find useful applications in separation technologies such magnetic density separation (MDS). In MDS a magnetic processing fluid (also referred to as ferrofluid) is used as separation medium. A typical example of such a process is described in EP1800753, incorporated herein in its entirety. Other examples are found in WO 2014/158016 and WO 2015/050451, also incorporated herein in their entirety. MDS is used in raw materials processing for the classification of mixed streams into streams with particles of different types of materials. For these MDS applications, ferrofluids are essential.

Ferrofluids are typically colloidal fluids of ferromagnetic or ferrimagnetic nanoparticles (herein also referred to as magnetic nanoparticles) that are suspended in a carrier fluid. In typical embodiments, the magnetic nanoparticles are based on magnetic iron oxides such as magnetite ($Fe^{2+}Fe^{3+}{}_2O_4$ or simply $Fe_3O_4$) and maghemite ($\gamma$-$Fe_2O_3$). In particular magnetite is used.

The colloidal fluid is typically prepared by precipitating the respective iron ions as iron oxides using a base such as sodium hydroxide. For this preparation, a stock solution can be used that comprises these iron ions. The quality and the magnetic properties of the ferrofluid strongly depends to the quality and the purity of the magnetic nanoparticles. More precisely, for example for magnetite-based ferrofluid, it is important that the ratio of Fe(II) and Fe(III) in all of the nanoparticles is about or preferably exactly 1:2. As such, all iron ions are most effectively used and end up as magnetite nanoparticles. Accordingly, to achieve a good quality of the ferrofluid, it is desired that the stock solution already comprises the desired ratio of Fe(II) and Fe(III).

Conventionally, the stock solution is prepared by independently dissolving the desired amount of Fe(II) and Fe(III) (e.g. as $FeCl_2$ and $FeCl_3$, respectively). A drawback of this approach is however that providing the individual Fe(II) and Fe(III) feeds is expensive and cumbersome. As an alternative approach, Morel et al., *Journal of Magnetism and Magnetic Materials* 343 (2013) 76-81 describe the process of preparing magnetite nanoparticles from mineral magnetite by first dissolving mineral microparticles (5 g) in 50 mL of hydrochloric acid (12 M). A drawback of this approach however, is that the resulting solution of ferrous-ferric is still very acidic such that large amounts of base are required when the solution is used for the preparation of the ferrofluid. Also, this process is poorly scalable to industrial process scale.

In the prior art, leaching processes are known as for example disclosed in WO 01/23627. In this disclosure, a metal bearing feed stock comprising iron oxide and ferrites is leached with a chloride solution. This process however, leads to an unfavorable Fe(II)/Fe(III) ratio and thus to impure magnetite. In addition, the process is carried at a neutral or basic pH (i.e. a pH of six or greater), rendering it slow or incomplete.

Another process is disclosed in U.S. Pat. No. 4,280,918. A gamma iron oxide powder is mixed with an excess of acid produce iron oxide particles that can be coated with colloidal silica to produce magnetic particles.

SUMMARY

It is an object of the present invention to address at least one, preferably all of the above-mentioned drawbacks.

Accordingly, the present invention is directed to a method of producing a stock solution for production of a ferrofluid, the process comprising contacting an acidic solution comprising an acid in a reaction container filled with an excess of a mineral bulk material, preferably a magnetic bulk material, wherein the acid reacts with the bulk material to form the stock solution comprising dissolved ferric (Fe(III)) and optionally ferrous (Fe(II)) ions; followed by separating said stock solution from the bulk material.

In a preferred aspect of the present invention, the magnetic bulk material has the same ratio (±10%) of ferrous (Fe(II)) and ferric (Fe(III)) ions as the ferrofluid ideally has. The advantage of this is that no separate ferrous (Fe(II)) or ferric (Fe(III)) ion source has to be provided.

The invention is described more fully hereinafter with reference to the accompanying drawings, in which embodiments of the invention are shown. In the drawings, the absolute and relative sizes of systems, components, layers, and regions may be exaggerated for clarity. Embodiments may be described with reference to schematic and/or cross-section illustrations of possibly idealized embodiments and intermediate structures of the invention. In the description and drawings, like numbers refer to like elements throughout. Relative terms as well as derivatives thereof should be construed to refer to the orientation as then described or as shown in the drawing under discussion. These relative terms are for convenience of description and do not require that the system be constructed or operated in a particular orientation unless stated otherwise.

BRIEF DESCRIPTION OF DRAWINGS

FIG. 1 illustrates a system for producing a stock solution in accordance with the present invention.

DETAILED DESCRIPTION

The present invention is directed to a method of producing a stock solution suitable for production of a ferrofluid. The process comprising contacting an acidic solution comprising an acid in a reaction container filled with an excess of a mineral, preferably a magnetic, bulk material, wherein the acid reacts with the bulk material to form the stock solution comprising dissolved ferric (Fe(III)) and optionally ferrous (Fe(II)) ions; followed by separating said stock solution from the magnetic bulk material.

In preferred aspects of the present invention, the magnetic bulk material has the same ratio (±10%) of ferrous (Fe(II)) and ferric (Fe(III)) ions as the ferrofluid ideally has. The advantage of this is that no separate ferrous (Fe(II)) or ferric (Fe(III)) ion source has to be provided.

In the present invention, the bulk material is used in an excess with respect to the acid in the acidic solution. The advantage of this is that (theoretically) the acid can fully react with the bulk material such that the stock solution can be produced having a neutral acidity. In practice however, the stock solution may still have a pH of more than 1, as it may take a long time for all of the acid to react while this level of acidity may relatively easily be quenched by a limited amount of base in the ferrofluid production.

In a particular embodiment of the present invention the reaction container is a reactor (12) that is at least partially filled with a bed of particles comprising the bulk material and wherein the method preferably comprises the acidic solution flowing through a bed of said bulk material such that the process is a continuous process. This process is particularly suitable for the preparation of the stock solution at large scale.

Examples of suitable reactors include plug flow reactors, tube reactors, percolator reactors, intermediate bulk container (IBC) reactors and the like. Reactors of the flow-through type wherein stirring is not carried out are particularly preferred. Alternative reactors such a stirred-tank reactors comprising mixers are not preferred. In a preferred embodiment, the acid is flown through the bed by pumping the acid with only one pump. As such, even for long residence time in the order of hours or days, the process of the invention can still efficiently be carried out.

The present inventors surprisingly further found that for an efficient reaction rate and sufficient conversion of the acid, it is very advantageously to minimize the amount of gas entrained in the bed of bulk material (herein also referred to as the interstitial space between the bed particles being occupied by gas). In a preferred embodiment of the method, less than 60 vol %, preferably less than 40 vol %, more preferably less than 30 vol %, even more preferably less than 10 vol %, most preferably less than 5% of the interstitial space between said particles is occupied by a gas. It was found that for obtaining the stock solution with a sufficiently high pH in a continuous process according a preferred embodiment of the invention, most of the acid has to be consumed and that this can in practice generally only be achieved by maintaining a sufficiently small volume of the interstitial space between the particles occupied by the gas.

The inventors found that in case a large amount of the interstitial space remains occupied by a gas, the acid liquid may not flow through this space, effectively limiting the contact area available for the reaction of the acid with the bulk material particles (also referred to a reaction surface area). In other words, surface wetting of the bulk material can be hindered by entrained gas in the bulk material. Since the particles are preferably relatively small, occupation of the interstitial space by gas can have a dramatic effect on the available reaction surface area. Minimization of entrained gas in the bed, can be achieved by a number of measures which will be discussed below.

Although the issues around the entrainment of gas can arise for the bulk material of any size, the inventors particularly observed these issues arising when the bulk material comprises particles having a size of more than 1 micron such as 5 micron or more. Reducing the interstitial space that is occupied by gas in the ranges as disclosed herein-above is thus particularly advantageous and preferred for bulk material comprising particles have a particle size between 1 micron and up, such as 5 micron to 1 millimeter.

Preferably, the bulk material is essentially free of carbonates or other compounds that can form gas upon contact with the acid. For instance, raw magnetite ore may comprise substantial amounts of carbonate that result in $CO_2$ formation upon contact with the acid. As such, it is preferred to use pre-treated, decarbonated or otherwise purified bulk material. As such, preferably the bulk material comprises at least 90 w/w %, preferably at least 95 w/w %, more preferably at least 98 w/w % of said iron oxide most preferably 99 w/w % or more, based on the total weight of the bulk material. If some carbonate or other gas forming constituent may remain (in small quantities), gas resulting from these constituent may be released from the bed by thoroughly mixing the bed and the acid upon contact with the acid to allow the gas to escape before the bed settles in the reactor volume.

Thoroughly mixing the bed and the acid before the bed is allowed to settle is also beneficial to allow other gas (e.g. air) that is entrained in the dry (e.g. powder) bulk material to escape. It was found that filling the reaction container with the dry bulk material followed by leading liquid (e.g. the acid) through the bed generally does not sufficiently remove the entrained gas, even if the fluid of lead from the bottom to the top to facilitate entrained between the particles to escape to the top. Thorough mixing of the bed and acid is therefore also advantageous even if the bulk material is essentially free of carbonates or other compounds that can form gas upon contact with the acid.

Additionally, or alternatively to the mixing, removing of the entrained gas may also be achieved by ultrasonic treatment of the bed when it has been wetted with the acidic solution. Typically, this has only to be carried out after the reactor is refilled with the bulk material and the acidic solution, as the process typically does essentially not produce gas.

Yet another measure that can be taken to reduce the amount of entrained gas in the bed that may be formed over the lifetime of the bed. In a preferred embodiment of the invention, the acid is fed to the reaction container at a higher temperature than the temperature of the stock solution produced. Liquids at a high temperature typically have less capacity for absorbing gases than liquids at a low temperature, and so any gas entering the bed will escape with the product flow.

The amount of interstitial space between the bed particles being occupied by gas can be determined by placing the reaction container containing the packed bed and the acid under reduced pressure (e.g. 0.5 bar or vacuum) and measuring the expansion of the packed bed (only the space occupied by gas will expand, the space occupied by acid will not).

The acid is generally an acid dissolved in water and as such, the stock solution is typically an aqueous stock solution. Preferably, the acid comprises a strong acid, more preferably a strong mineral acid, preferably a hydrogen halide, more preferably a hydrogen halide selected from the group consisting of hydrochloric acid, hydrobromic acid. A typical concentration of the acid in the acidic solution before contacting the bulk material is at least 10 w/w % acid, preferably at least 15 w/w %, e.g. between 18 to 40 w/w %. Strong acid are advantageous for a rapid leaching rate and mineral acids such as HCl and HBr are relatively inexpensive. An additional advantage of these mineral acids is that the produced stock solution retains the conjugated base of the acid (i.e. the anion such as $Cl^-$ or $Br^-$) and that this stock solution is then particularly suitable for the preparation of ferrofluids, as productions thereof with e.g. NaOH will then lead to the innocent NaCl or NaBr as side products. Accordingly, the pH of the acidic solution before contacting the bulk material is preferably less than 1, more preferably less than 0. During the reaction with the bulk material, the acid in the acidic solution is consumed and the pH will increase.

In principle, the acid directly reacts with the bulk material comprising Fe(III) and optionally Fe(II). Assuming the acid is fully consumed and reacts only with the bulk material, the concentration of acid and the concentration of Fe(II) and Fe(III) are correlated. Typically, the concentration of Fe(II) in the stock solution is more than 0.1 M but preferably it is more than 0.5 M, even more preferably more than 1 M. The concentration of Fe(III) naturally correlates to the concentration of Fe(II).

It is also preferable for the production of ferrofluids that the bulk material comprises an iron oxide, more preferably selected from the group consisting of magnetite $Fe_3O_4$, maghemite $\gamma$-$Fe_2O_3$, hematite $\alpha$-$Fe_2O_3$, or combinations thereof. The advantage thereof is that the matching Fe(II)/Fe(III) ratio of the bulk material is ideal for the preparation of the ferrofluid. The bulk material may be contaminated with other Fe(II) and/or Fe(III) such that the ratio may slight vary. Typically, the ratio of Fe(II) to Fe(III) in the stock solution differs less than 10%, preferably less than 5%, more preferably less than 1% from the ratio of Fe(II) to Fe(III) in the bulk material.

The bulk material comprises particles that preferably have a particle size between 1 micron-1 millimeter, more preferably between 5 micron and 500 micron, most preferably between 10 micron and 100 micron, for instance about 20 micron. On the one hand smaller particles may have a relatively large reaction surfaces, it may be easier to flow the solution through the spaces between larger particles.

Because the bulk material is used in excess, the acid in the acidic solution can be theoretically fully be converted. Practically however, full conversion is generally unfeasible and as such, a minor amount of acid may remain. These small amounts of acid can easily be neutralized by the base during the production of the ferrofluid. Accordingly, the stock solution has an acidity such that the pH is more than 0, preferably more than 1, more preferably more than 2, most preferably more than 3. Since some acid may unavoidably remain, the stock solution typically has pH of less than 4, but preferably less than 5. For example, in case the acid has a concentration in the acidic solution before contacting the bulk material of 10 M (i.e. at a concentration of about 31 w/w % HCl in water), and 99% of the acid will be consumed during the process, the stock solution will have an acidity of pH is 1.

In typical embodiments, contacting the acidic solution and the bulk material is carried out at a temperature $T_R$ between 20 and 120° C., preferably below 50° C. such as room temperature (i.e. about 20° C.). Elevated temperatures can be obtained by heating the acidic solution while flowing through the reaction container. As such, in an embodiment, the reaction container comprises a heating element 15. The acidic solution LR may also be heated before entering the reaction container 10. Alternatively, or additionally, the acid solution LR is heated by mixing a concentrated acid solution with hot water, wherein the diluted heated solution forms the acidic solution LR.

In a particular preferred embodiment, as illustrated in FIG. 1, wherein the acidic solution comprising HCl is flowing from a bottom 12*b* to a top 12*t* of the tube reactor 11 such that the stock solution is collected at the top 12*t*. In this embodiment, the reaction container 10 comprises at least two vertically elongate columns 11,12 which are fluidically connected at their respective bottoms 11*b*,12*b* to pass the reactant solution LR from the first column 11 to the second column 12. The reactant solution LR is flowed vertically downward from a top of the first column to pass through the connection into the second column and flowed upward from the bottom 12*b* of the second column 12 to be collected at the top 12*t* of the second column 12. Accordingly, in a preferred embodiment, the reaction container 10 comprises two concentric columns 11,12 fluidically connected at their respective bottoms 11*b*,12*b* such that the solution is flowed from the inner column to the outer column. Preferably, both columns are filled with the magnetite particles.

The present inventors realized that the present invention may not only advantageously be used for the production of the stock solution for the production of ferrofluids, but in other applications as well that consume or use Fe(III) and Fe(III) (e.g. in sewage plants). In such application, it may be that ferrous ions, Fe(II), may be used to make up vivianite (e.g. in sewer sludge), but in practice it is found that ferrous and ferric work equally well because the ferric turns quickly into ferrous due to the high organic content of the sludge. As such, the invention is not necessarily limited to magnetic bulk materials comprising both Fe(II) and Fe(III) but may also advantageously be applied to mineral bulk materials comprising Fe(III).

Terminology used for describing particular embodiments is not intended to be limiting of the invention. As used herein, the singular forms “a”, “an” and “the” are intended to include the plural forms as well, unless the context clearly indicates otherwise. The term “and/or” includes any and all combinations of one or more of the associated listed items. It will be understood that the terms “comprises” and/or “comprising” specify the presence of stated features but do not preclude the presence or addition of one or more other features. It will be further understood that when a particular step of a method is referred to as subsequent to another step, it can directly follow said other step or one or more intermediate steps may be carried out before carrying out the particular step, unless specified otherwise. Likewise it will be understood that when a connection between structures or components is described, this connection may be established directly or through intermediate structures or components unless specified otherwise.

In interpreting the appended claims, it should be understood that the word “comprising” does not exclude the presence of other elements or acts than those listed in a given claim; the word “a” or “an” preceding an element does not exclude the presence of a plurality of such elements; any reference signs in the claims do not limit their scope; several “means” may be represented by the same or different item(s) or implemented structure or function; any of the disclosed devices or portions thereof may be combined together or separated into further portions unless specifically stated otherwise. Where one claim refers to another claim, this may indicate synergetic advantage achieved by the combination of their respective features. But the mere fact that certain measures are recited in mutually different claims does not indicate that a combination of these measures cannot also be used to advantage. The present embodiments may thus include all working combinations of the claims wherein each claim can in principle refer to any preceding claim unless clearly excluded by context.

Comparative Example 1

A method carried out as published in Morel et al., *Journal of Magnetism and Magnetic Materials* 343 (2013) 76-81 wherein the magnetite nanoparticles are formed from mineral magnetite by dissolving mineral microparticles (5 g, 0.022 mol) in 50 mL of hydrochloric acid (12 M), results in a maximum conversion of about 30 wt % of the HCl and thus in stock solution having a pH of −0.92 or less and containing 0.44 M Fe(II) and 0.88 M Fe(III).

Example 1—Allowing Escape of Entrained Gas from Magnetite Bulk Material

A bed of magnetite bulk material (particle size between 10 micron and 100 micron) was created by mixing a flow of dry magnetite powder with hydrochloric acid into a slurry using intensive stirring of freshly added particles to the slurry, so that any air passed into the liquid with the powder, or any gas (e.g. carbon dioxide) resulting from reactions of gangue minerals (minerals other than magnetite present in the powder) with the acid, were allowed to escape from the particles and the liquid before the particles were made to settle onto the surface of the bed. This way, a bed of fine magnetite was produced through which acid can freely flow, unhindered by the presence of tiny gas bubbles in the interstitial space between the particles, and thus experiencing a large effective surface area for the dissolution process.

Example 2—Stock Solution Production

In a reaction container comprising the bed prepared in accordance with Example 1, a hydrochloride acid solution (20 wt %) was flown through the bed at 50 degrees Celsius. The residence time was about 150 hours.

At the exit of the reaction container, a stock solution comprising Fe(II) and Fe(III) in a ratio of 1:2 was obtained. A sample of 25 ml of the stock solution was neutralized with 1.5 molar NaOH solution to get 5.3 g of solid residue (magnetite).

Example 3—Comparing Reactor Filling Methods and Amounts of Entrained Gas

In Version A of the experiment, to a glass container was added 300 ml of an acidic solution comprising hydrochloric acid followed by slow addition of 800 g of 20 micron magnetite by a vibratory feeder over 10 minutes while stirring the mixture with a laboratory mixer at 120 RPM.

In Version B of the experiment, a same glass container was first filled with 800 g of magnetite and then acidic solution comprising hydrochloric acid was lead through the bed from the bottom of the vessel, so that it flowed up through the bed.

In each case the final liquid level was marked and the corresponding volumes were measured by filling the vessels up to the mark by water.

Then, the amount of interstitial space between the bed particles being occupied by gas was determined by measuring the respective volumes in the vessels. The results hereof are provide in Table 1.

TABLE 1

| | Material volume (ml) | Bulk volume (ml) | Interstitial volume (ml) | Interstitial space filled with air |
|---|---|---|---|---|
| Calibration | | | | |
| Magnetite (800 g) | 160 | 266 | 106 | |
| Water | 300 | | | |
| Total | 460 | | | |
| Measured | | | | |
| Version A | 461.6 | | 1.6 | 1.5% |
| Version B | 490.6 | | 30.6 | 28.7% |

Example 4—Stock Solution Production

A dry magnetite powder without any extra pre-treatment was densely packed into a reaction container and a hydrochloride acid solution (20 wt %) was flown through the bed at 50 degrees Celsius. At the exit of the reaction container, a solution comprising mainly HCl was obtained. A sample of 25 ml of that solution was neutralized with 1.5 molar NaOH solution without yielding any solid residue.

The invention claimed is:

1. A method of producing a stock solution, comprising:
contacting an acidic solution comprising an acid in a reaction container filled with an excess of a mineral bulk material comprising Fe(III) and optionally Fe(II), wherein the mineral bulk material is in excess with respect to the acid in the acidic solution whereby, theoretically, the acid can fully react with the bulk material;
wherein the acid reacts with the bulk material to form the stock solution comprising dissolved ferric (Fe (III)) and optionally ferrous (Fe(II)) ions; and
separating said stock solution from the mineral bulk material.

2. The method according to claim 1, wherein the mineral bulk material is a magnetic bulk material and comprises Fe(II) and Fe(III) and wherein the stock solution comprises dissolved ferrous (Fe(II)) and ferric (Fe(III)) ions.

3. The method according to claim 1, wherein the reaction container is a reactor that is at least partially filled with a bed of particles comprising the bulk material and wherein the method optionally comprises the acidic solution flowing through a bed of said bulk material such that the process is a continuous process.

4. The method according to claim 3, wherein less than 60 vol % of the interstitial space between said particles is occupied by a gas.

5. The method according to claim 4, wherein less than 40 vol % of the interstitial space between said particles is occupied by a gas and the less than 40 vol % of the interstitial space is optionally obtained by ultrasonic treatment of the bed.

6. The method according to claim 1, wherein the acid comprises a strong acid, which is optionally a strong mineral acid.

7. The method according to claim 1, wherein the mineral bulk material comprises an iron oxide, optionally selected from the group consisting of magnetite ($Fe_3O_4$), maghemite ($\gamma$-$Fe_2O_3$), hematite ($\alpha$-$Fe_2O_3$), and combinations thereof.

8. The method according to the claim 7, wherein the bulk material comprises at least 90 w/w %, optionally at least 95 w/w %, or at least 98 w/w % of said iron oxide, based on the total weight of the bulk material.

9. The method according to claim 2, wherein the ratio of Fe(II) to Fe(III) in the stock solution differs by less than 10%, optionally less than 5%, or less than 1% from the ratio of Fe(II) to Fe(III) in the bulk material.

10. The method according to claim 1, wherein the stock solution has an acidity (pH) of more than 1, optionally more than 2, or more than 3.

11. The method according to claim 1, wherein the acidic solution before contacting the bulk material comprises at least 10 w/w % acid, optionally at least 15 w/w %.

12. The method according to claim 1, wherein contacting the acidic solution and/or bulk material is carried out at a temperature between 2° and 120° C., optionally below 50° C.

13. The method according to claim 1, wherein the bulk material comprises particles have a particle size between 1 micron and 1 millimeter, optionally between 5 micron and 500 micron, or between 10 micron and 100 micron.

14. The method according to claim 4, wherein less than 30 vol % of the interstitial space between said particles is occupied by a gas.

15. The method according to claim 14, wherein less than 10 vol % of the interstitial space between said particles is occupied by a gas.

16. The method according to claim 6, wherein the acid is a hydrogen halide, optionally selected from the group consisting of hydrochloric acid and hydrobromic acid.

17. The method according to claim 11, wherein the acidic solution before contacting the bulk material comprises between 18 to 40 w/w %.

* * * * *